US012238474B2

(12) United States Patent
Hui et al.

(10) Patent No.: US 12,238,474 B2
(45) Date of Patent: Feb. 25, 2025

(54) SPEAKER BOX

(71) Applicant: AAC Technologies Pte. Ltd., Singapore (SG)

(72) Inventors: Yao Hui, Shenzhen (CN); Yufen Chu, Shenzhen (CN); Jiujian Liu, Shenzhen (CN); Weimin Chen, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 287 days.

(21) Appl. No.: 18/089,575

(22) Filed: Dec. 28, 2022

(65) Prior Publication Data

US 2024/0056728 A1 Feb. 15, 2024

Related U.S. Application Data

(63) Continuation of application No. PCT/CN2022/120175, filed on Sep. 21, 2022.

(30) Foreign Application Priority Data

Aug. 15, 2022 (CN) ......................... 202210975595.7

(51) Int. Cl.

*H04R 7/18* (2006.01)
*H04R 1/02* (2006.01)
*H04R 1/28* (2006.01)
*H04R 7/04* (2006.01)
*H04R 9/02* (2006.01)
*H04R 9/04* (2006.01)
*H04R 9/06* (2006.01)

(52) U.S. Cl.

CPC ........... *H04R 1/2826* (2013.01); *H04R 1/025* (2013.01); *H04R 7/04* (2013.01); *H04R 7/18* (2013.01); *H04R 9/025* (2013.01); *H04R 9/045* (2013.01); *H04R 9/063* (2013.01); *H04R 2400/11* (2013.01)

(58) Field of Classification Search

CPC ........ H04R 1/2826; H04R 1/025; H04R 7/04; H04R 7/18; H04R 9/025; H04R 9/045; H04R 9/063; H04R 2400/11; H04R 31/006; H04R 1/2811

USPC ........ 381/396, 398, 412, 418, 420–424, 433

See application file for complete search history.

(56) References Cited

U.S. PATENT DOCUMENTS 10,038,953 B2 * 7/2018 Hui ........................ H04R 9/025
10,820,115 B2 * 10/2020 Zhang ...................... H04R 7/18

(Continued)

*Primary Examiner* — Xu Mei
(74) *Attorney, Agent, or Firm* — W&G Law Group

(57) ABSTRACT

The present invention provides a speaker box including a housing, a sound unit and a magnetic circuit coupling valve. The sound unit includes a bracket, a vibration system and a magnetic circuit system including a secondary magnet. The housing includes a bottom cover having leakage holes. The magnetic circuit coupling valve is accommodated in a rear cavity and includes a support, a negative stiffness diaphragm and a coil. The negative stiffness diaphragm faces to the leakage holes. The coil receives an external control signal and generates an electromagnetic field with the secondary magnet to drive the negative stiffness diaphragm to seal the leakage holes, or make the leakage holes open, or make the leakage holes partially open or closed. Compared with a related technology, the speaker box has fine acoustic performance and is able to accurately control communication of a rear cavity with the outside.

10 Claims, 11 Drawing Sheets

(56) References Cited

U.S. PATENT DOCUMENTS

| | | | | |
|---|---|---|---|---|
| 11,832,060 | B2 * | 11/2023 | Zhang | G10K 11/178 |
| 12,047,733 | B1 * | 7/2024 | Ren | H04R 1/24 |
| 12,089,023 | B2 * | 9/2024 | Chen | H04R 9/025 |
| 12,156,007 | B2 * | 11/2024 | Ren | H04R 9/025 |
| 2016/0329041 | A1 * | 11/2016 | Qi | G10K 9/13 |
| 2024/0073619 | A1 * | 2/2024 | Liu | H04R 1/025 |

* cited by examiner

SPEAKER BOX

CROSS REFERENCE TO RELATED APPLICATIONS

The present application is a continuation of PCT Patent Application No. PCT/CN2022/120175, filed Sep. 21, 2022, which claims priority to Chinese patent application No. 202210975595.7, filed Aug. 15, 2022, each of which is incorporated by reference herein in its entirety.

TECHNICAL FIELD

The present invention relates to the field of acoustoelectric technology, and particularly relates to a speaker box applicable to a portable electronic product.

BACKGROUND

With advent of a mobile Internet era, the number of smart mobile devices is continuously increasing. Among various mobile devices, mobile phones are undoubtedly the most common and portable mobile terminal devices. Speaker boxes for playing sound are widely applied to current smart mobile devices like mobile phones. A size of a rear cavity in a speaker box is closely related to acoustic quality of the speaker box.

In a related art, a vibration system in a speaker box includes a housing and a sound unit. The sound unit separates the housing into a front cavity and a rear cavity. In order to achieve air pressure balance and heat dissipation in the rear cavity, the housing is provided with a vent enabling the rear cavity to be in communication with the outside. In addition, a valve is provided in the vent to control the communication of the rear cavity with the outside.

However, in the speaker box in the related art, the valve and a switch controlling the valve are not disclosed as specific devices. Correspondingly, the control performance of controlling the valve, a response speed and stability are not embodied or solved in the solutions. Further, a technical solution in the related art mainly solves the problem of air pressure adjustment in the rear cavity, but no solution in sound leakage control is proposed. As a result, acoustic performance of the speaker box is limited. It is a technical problem desired to be solved to form an ideal acoustic dipole by vibration on a sound surface of the speaker box, to improve sound leakage control when the speaker box is taken as a caller receiver in a phone call mode, and to improve sound separation so as to improve acoustic performance of the speaker box.

Therefore, it is necessary to provide a new speaker box to solve the above-described technical problem.

SUMMARY

The present invention aims to provide a speaker box that is able to accurately control communication of a rear cavity with the outside and has good acoustic performance.

To this end, the present invention provides a speaker box including a housing and a sound unit fixedly accommodated in the housing. The sound unit includes a bracket, a vibration system and a magnetic circuit system having a magnetic gap, the vibration system and the magnetic circuit system are fixed to the bracket. The magnetic circuit system includes a yoke, a primary magnet fixed to the yoke and an secondary magnet spaced from the primary magnet to form the magnetic gap. The housing includes a bottom cover fixed to the bracket. The bottom cover, the bracket and the magnetic circuit system form a rear cavity. The bottom cover includes one or more leakage holes provided through the bottom cover. The rear cavity is in communication with outside through the one or more leakage holes. The speaker box further includes a magnetic circuit coupling valve accommodated in the rear cavity. The magnetic circuit coupling valve includes a support fixed to the bracket or the yoke, a negative stiffness diaphragm fixed to the support and a coil fixed on a side of the negative stiffness diaphragm close to the secondary magnet and separated from the secondary magnet. The negative stiffness diaphragm faces to and is separated from the one or more leakage holes. The coil receives an external control signal and generates an electromagnetic field with the secondary magnet to drive the negative stiffness diaphragm to abut on and seal the one or more leakage holes to a closed state, or drive the negative stiffness diaphragm to separate from the one or more leakage holes to make the one or more leakage holes open, or drive the negative stiffness diaphragm to partially abut on the one or more leakage holes to make the one or more leakage holes partially open or closed.

In some embodiments, there are two secondary magnets arranged on either sides of the primary magnet. The bottom cover includes a bottom cover plate arranged to face to and separate from the yoke and a bottom cover side wall that bends at a periphery of the bottom cover plate and extends from the periphery along an outer surface of the sound unit, the bottom cover side wall is fixedly connected to the bracket. The one or more leakage holes are formed on the bottom cover side wall, and the magnetic circuit coupling valve is arranged on a side of one of the two secondary magnets away from the primary magnet.

In some embodiments, the negative stiffness diaphragm includes an elastic film and a seal for sealing the one or more leakage holes, the seal is arranged to face to the one or more leakage holes. The elastic film includes a first fixing portion, an elastic bending portion formed by bending and extending a periphery of the first fixing portion and a second fixing portion extending away from a side of the first fixing portion from the elastic bending portion. The second fixing portion is fixed to a side of the support away from the secondary magnets. The coil is fixed to a side of the first fixing portion close to the secondary magnets. The seal is fixed to a side of the first fixing portion away from the secondary magnets. In response to there being no current in the coil, a distance between the second fixing portion and the seal in a moving direction of the coil is greater than a distance between the second fixing portion and the bottom cover side wall on which the one or more leakage holes are formed in the moving direction of the coil.

In some embodiments, the negative stiffness diaphragm is a symmetrical structure or an asymmetrical structure.

In some embodiments, the negative stiffness diaphragm is in a form of a bilaterally symmetrical or quadrilaterally symmetrical rectangle, or of a rectangle with four asymmetrical corners, or a side of the negative stiffness diaphragm is fixed by a hinge and an opposite side of the negative stiffness diaphragm is in a negative stiffness bending form.

In some embodiments, the magnetic circuit system further includes an secondary magnetic conductive plate fixed to a side of the secondary magnets away from the yoke, the coil is shaped as a runway structure, and the secondary magnetic conductive plate at least partially extends into the coil.

In some embodiments, the speaker box further includes a gasket accommodated in the rear cavity. The gasket is fixed to an inner side of the bottom cover side wall on which the one or more leakage holes are formed.

In some embodiments, the gasket is a rubber sheet, flexible foam, macromolecular gel or high-viscosity grease.

In some embodiments, the vibration system includes a diaphragm fixed to the bracket, and a sound coil fixed to the diaphragm and inserted into the magnetic gap, the sound coil is configured to drive the diaphragm to vibrate and sound. The sound unit further includes an top cover pressed to the diaphragm and forming a front cavity with the diaphragm, sound holes are defined in the top cover, and the front cavity is in communication with the outside through the sound holes.

In some embodiments, the vibration system further includes an elastic support component fixed to the bracket and connected to an end of the sound coil away from the diaphragm. The elastic support component is provided with four pads each arranged at a respective corner of the elastic support component. The sound coil has two wires each welded to a respective pad of two of the four pads. The coil has two wires each welded to a respective pad of the other two of the four pads, or one of the two wires of the coil is welded to one of the two pads to which the two wires of the sound coil are welded, so as to share with the sound coil one pad that functions as a negative electrode.

Compared with a related technology, in the speaker box according to the present invention, the magnetic circuit coupling valve is arranged in the rear cavity. The magnetic circuit coupling valve includes the support, the coil and the negative stiffness diaphragm. A plurality of leakage holes are formed in the bottom cover of the housing. The support is fixed to the bracket or the yoke. The negative stiffness diaphragm is fixed to the support. The coil is fixed on a side of the negative stiffness diaphragm close to the secondary magnet and is separated from the secondary magnet. The negative stiffness diaphragm faces to and is separated from the leakage holes. With the structure as described above, when the negative stiffness diaphragm is in operation, the coil receives an external control signal and generates an electromagnetic field with the secondary magnet to drive the negative stiffness diaphragm to abut on and seal the leakage holes to a closed state, or drive the negative stiffness diaphragm to separate from the leakage holes to make the leakage holes open, or drive the negative stiffness diaphragm to partially abut on the leakage holes to make the leakage holes partially open or closed. In other words, the negative stiffness diaphragm can seal the leakage holes. Use of the negative stiffness diaphragm can optimize sound leakage control and enhance acoustic isolation. In this way, the acoustic performance of the speaker box can be improved. In addition, the structure as described above can achieve communication of the rear cavity with the outside by accurately controlling the leakage holes through the magnetic circuit coupling valve. Double steady states, i.e. a steady open state or a steady closed state of the magnetic circuit coupling valve can be achieved by merely inputting an input control signal of an external linear voltage once for a short time, to control the magnetic circuit coupling valve to open or close. During the control of partially open state or partially closed state of the leakage holes by the magnetic circuit coupling valve, accurate control can be achieved by continuously inputting a small input control signal of an external linear voltage for a short time. The signal is determined by a stiffness coefficient of the negative stiffness diaphragm and a driving force of the coil. In this way, the speaker box can accurately control a state of communication of the rear cavity with outside air, and the speaker box can have good acoustic performance.

BRIEF DESCRIPTION OF DRAWINGS

In order to describe technical solutions in embodiments of the present invention more clearly, accompanying drawings which are used to describe the embodiments are briefly illustrated below. Obviously, the drawings in the following description are only some embodiments of the present invention. Skilled persons in the art may obtain other drawings according to these drawings without creative efforts.

DETAILED DESCRIPTION OF EMBODIMENTS

Figure 1:
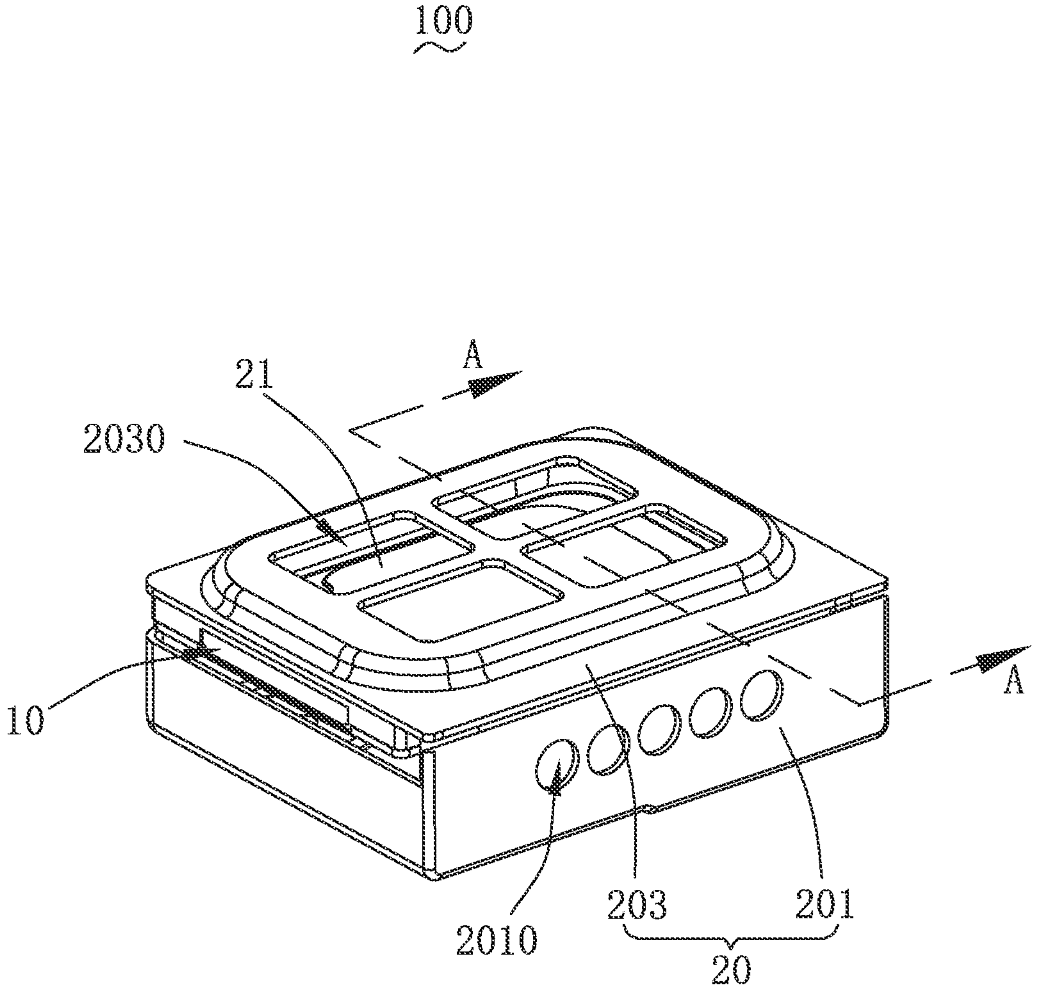
FIG. 1 shows a perspective schematic view of the structure of a speaker box in the present invention.
Figure 2:
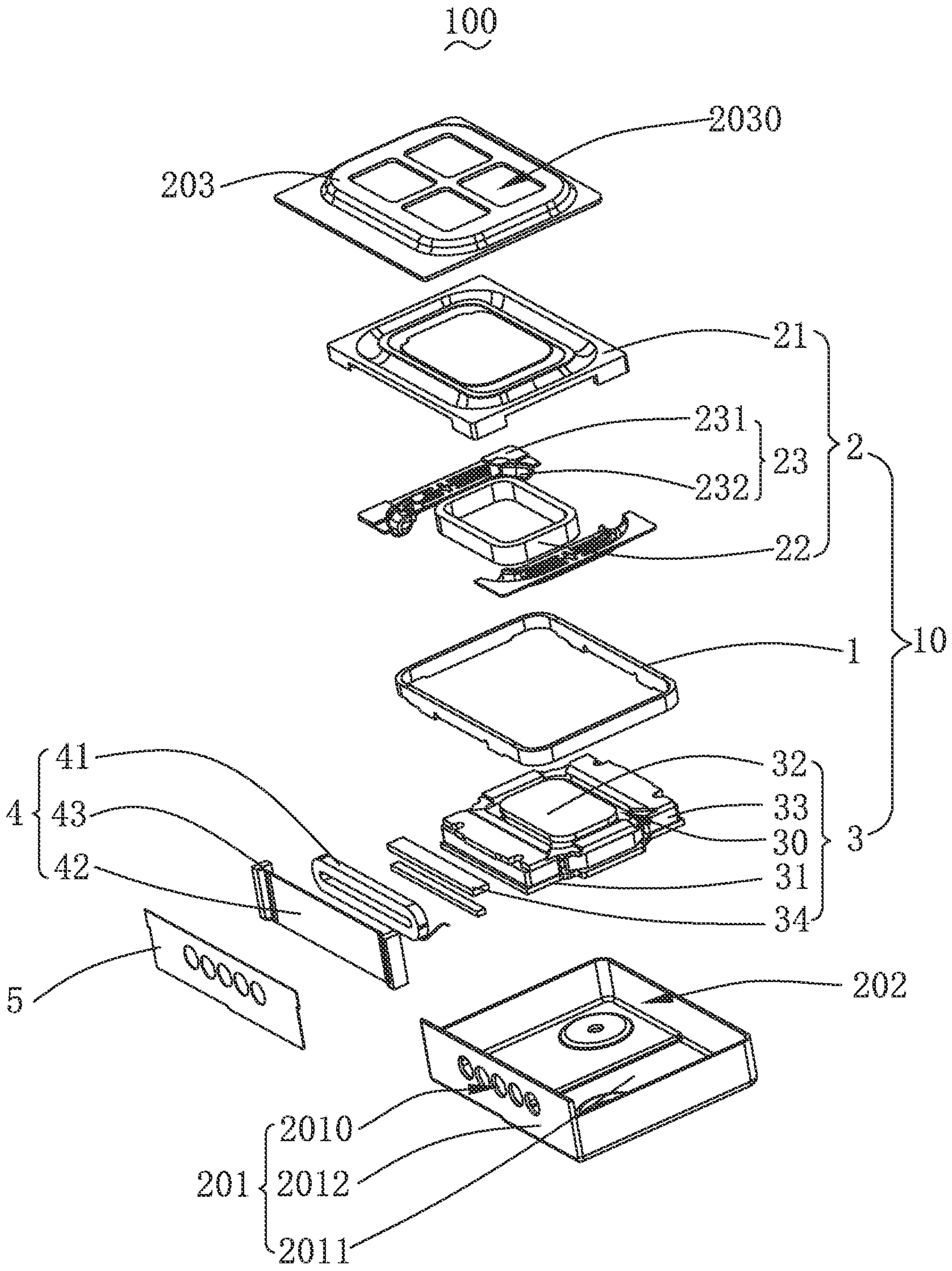
FIG. 2 shows a perspective exploded view of partial structure of the speaker box in the present invention.
Figure 3:
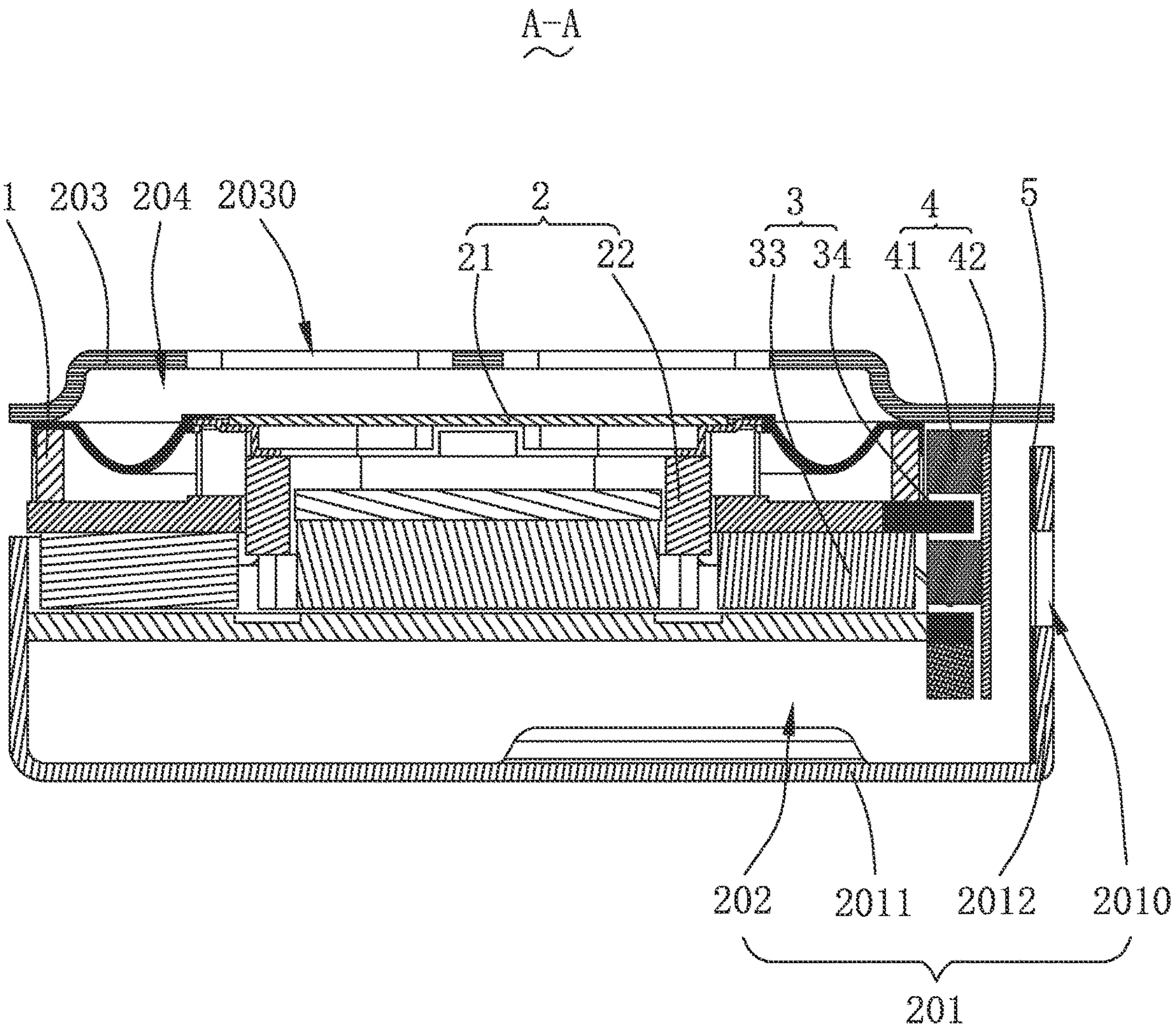
FIG. 3 shows a cross-sectional view along an A-A line as shown in FIG. 1.
Figure 4:
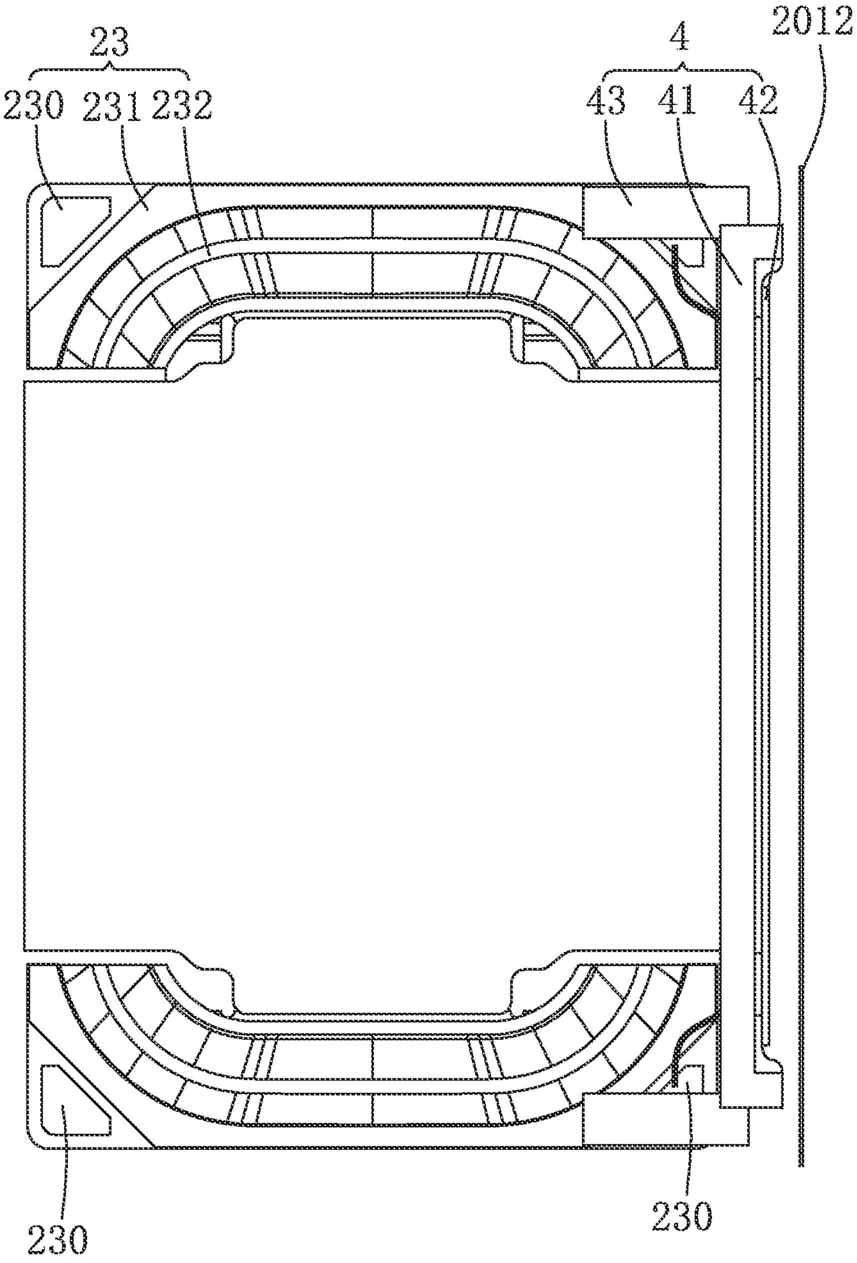
FIG. 4 shows an assembled structure of sound unit and magnetic circuit coupling valve according to an embodiment of the speaker box in the present invention.

Technical solutions in embodiments of the present invention will be clearly and completely described with reference to accompany drawings of the present invention. Obviously, the described embodiments are only some embodiments rather than all embodiments of the present invention. Based on the embodiments of the present invention, all other embodiments obtained by skilled persons in the art without making any creative efforts fall into the scope of protection of the present invention.

With reference to FIGS. 1-4, the present invention provides a speaker box 100 including a sound unit 10, a housing 20 and a magnetic circuit coupling valve 4.

The sound unit 10 is fixedly accommodated in the housing 20. The sound unit 10 includes a bracket 1, a vibration system 2 and a magnetic circuit system 3 having a magnetic gap 30, the vibration system 2 and the magnetic circuit system 3 are fixed to the bracket 1.

The vibration system 2 includes a diaphragm 21, a sound coil 22 and an elastic support component 23.

The diaphragm 21 is fixed to the bracket 1.

The sound coil 22 is fixed to the diaphragm 21. The sound coil 22 is inserted in the magnetic gap 30 to drive the diaphragm 21 to vibrate and sound.

The elastic support component 23 is fixed to the bracket 1 and is connected to an end of the sound coil 22 away from the diaphragm 21. The elastic support component 23 includes an elastic member 231 having one end fixed to the bracket 1 and another end fixed to an end of the sound coil 22 away from the diaphragm 21, and an auxiliary diaphragm 232 connected on a side of the elastic member 231 away from the diaphragm 21. On the one hand, the elastic support component is used to strengthen a vibration effect of the diaphragm 21, thereby improving acoustic performance of the speaker box 100. On the other hand, the elastic support component is used to balance swinging of the vibration system 2, thereby improving stability of the speaker box 100.

In some embodiments, the elastic member 231 is a flexible circuit board. The sound coil 22 and the elastic member 231 are electrically connected to each other. On the one hand, the elastic member is used to improve vibration strength and balance of the vibration system 2, and to inhibit swinging. On the other hand, the elastic member is used to connect the sound coil 22 to an external power supply, thereby avoiding a risk that a wire of the sound coil is prone to break when a wiring structure of the sound coil is lead to the power supply.

The magnetic circuit system 3 is used to drive the vibration system 2 to vibrate and sound. The magnetic circuit system 3 includes a yoke 31, a primary magnet 32 fixed to the yoke 31, a secondary magnet 33 spaced from the primary magnet 32 to form the magnetic gap 30 and a secondary magnetic conductive plate 34 fixed on a side of the secondary magnet 33 away from the yoke 31.

In some embodiments, the yoke 31 is fixed to the bracket 1.

In some embodiments, the primary magnet 32 is in a form of a rectangle. There are two secondary magnets 33 arranged on either sides of the primary magnet 32. The two secondary magnets 33 are arranged on either sides of a long axis of the primary magnet 32. There are two elastic support components 23 that are arranged on either sides of a short axis of the primary magnet 32.

The housing 20 includes a top cover 203 and a bottom cover 201.

The top cover 203 is pressed to the diaphragm 21 and forms a front cavity 204 with the diaphragm 21. The front cavity 204 is used to improve high-frequency acoustic performance of the speaker box 100. Sound holes 2030 are defined in the top cover 203. The front cavity 204 is in communication with the outside through the sound holes 2030. This structure enables the front cavity 204 to form a front sound structure for high-frequency sound through the sound holes 2030.

The bottom cover 201 is fixed to the bracket 1. The bottom cover 201, the bracket 1 and the magnetic circuit system 3 form a rear cavity 202. The rear cavity 202 is used to improve low-frequency acoustic performance of the speaker box 100.

The bottom cover 201 includes a bottom cover plate 2011 arranged to face to and separate from the yoke 31, and a bottom cover side wall 2012 that bends at a periphery of the bottom cover plate 2011 and extends from the periphery along an outer surface of the sound unit 10, the bottom cover side wall 2012 is fixedly connected to the bracket 1, and one or more leakage holes 2010 are defined through the bottom cover side wall. The rear cavity 202 is in communication with the outside through the leakage holes 2010.

A plurality of leakage holes 2010 may be holes formed on a thin wall and be arranged in a form of a square array, a circular array or the like. In some embodiments, a total area of the plurality of leakage holes 2010 is equal or similar to an area of the sound holes 2030. This structure provides the plurality of leakage holes 2010 with an area similar to an area of a receiver functioning as a telephone receiver. In this embodiment, a total area of the plurality of leakage holes 2010 is configured to be equal to the area of the sound holes 2030, in this way, the speaker box 100 can have fine acoustic performance.

In some embodiments, the leakage holes 2010 cross through the bottom cover side wall 2012. That is, the leakage holes 2010 are defined in the bottom cover side wall 2012. This structure enables the rear cavity 202 to form a side sound structure of low-frequency sound through the leakage holes 2010.

The magnetic circuit coupling valve 4 is accommodated in the rear cavity 202. In some embodiments, the magnetic circuit coupling valve 4 is arranged on a side of one of the two secondary magnets 33 away from the primary magnet 32.

The magnetic circuit coupling valve 4 includes a support 43, a negative stiffness diaphragm 42 and a coil 41. The support 43 is fixed to the bracket 1 or the yoke 31. The support 43 and the sound unit 10 are assembled as a single piece and are then installed to the speaker box 100. In this embodiment, the support 43 is fixed to the bracket 1.

The negative stiffness diaphragm 42 is fixed to the support 43. The negative stiffness diaphragm 42 is arranged to face to and be separated from the leakage holes 2010.

The coil 41 is fixed on a side of the negative stiffness diaphragm 42 close to the secondary magnet 33, and is separated from the secondary magnet 33.

In this embodiment, the coil 41 is shaped as a runway structure, and the secondary magnetic conductive plate 34 at least partially extends into the coil 41. This structure can improve magnetic circuit performance of the magnetic circuit coupling valve 4.

Figure 5:
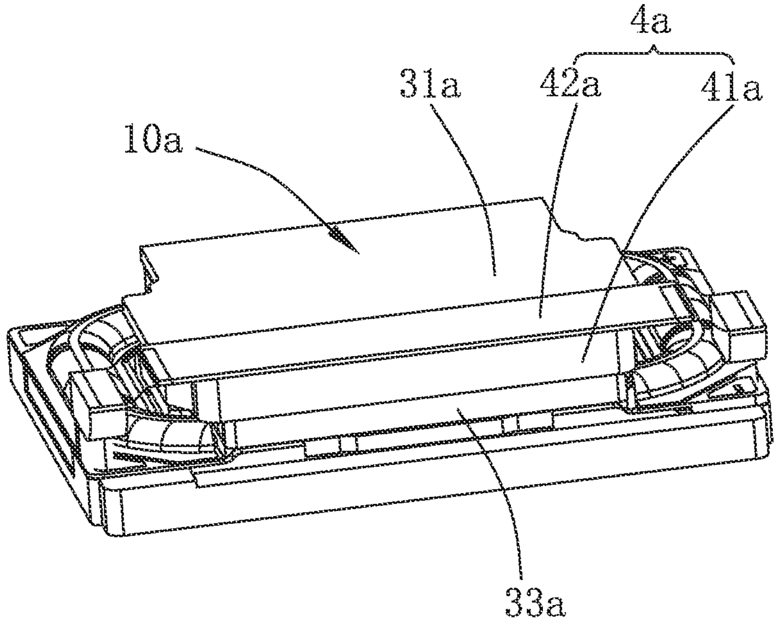
FIG. 5 shows an assembled structure of sound unit and magnetic circuit coupling valve according to another embodiment of the speaker box in the present invention.

On a basis that the magnetic circuit coupling valve 4 takes the secondary magnet 33 of the magnetic circuit system 3 as a drive magnetic field, the magnetic circuit coupling valve 4 uses the coil 41 to drive the negative stiffness diaphragm 42 to achieve control of opening and closing of the leakage holes 2010. The present invention is not limited to this. With Reference to FIG. 5, in another embodiment, a magnetic circuit coupling valve 4*a* is arranged on a single side of a yoke 31*a*. A coil 41*a* is superimposed on a secondary magnet 33*a*, and a negative stiffness diaphragm 42*a* is on a single side of the yoke 31*a*.

The coil 41 receives an external control signal and generates an electromagnetic field with the secondary magnet 33 to drive the negative stiffness diaphragm 42 to abut on and seal the leakage holes 2010 to a closed state, or drive the negative stiffness diaphragm 42 to separate from the leakage holes 2010 to make the leakage holes 2010 open, or drive the negative stiffness diaphragm 42 to partially abut on the leakage holes 2010 to make the leakage holes 2010 partially open or closed. A working principle of the magnetic circuit coupling valve 4 is the same as that of the sound unit 10. Specifically, an electromagnetic field is generated by the energized coil 41 and the secondary magnet 33. The coil 41 moves under a Lorentz force. By inverting the normal phases and the opposite phases of current in the coil 41, a direction of the force acting on the coil 41 changes, so that the coil can approach or depart from the leakage holes 2010. The negative stiffness diaphragm 42 can seal the leakage holes 2010. Use of the negative stiffness diaphragm 42 can optimize control on sound leakage and enhance acoustic isolation. In this way, the acoustic performance of the speaker box 100 can be improved. The structure as described above can achieve communication of the rear cavity 202 with the outside by accurately controlling the leakage holes 2010 through the magnetic circuit coupling valve 4. Double steady states, i.e. a steady open states or a steady closed state of the magnetic circuit coupling valve 4 can be achieved by merely inputting an input control signal of an external linear voltage once for a short time, to control the magnetic circuit coupling valve to open or close. The magnetic circuit coupling valve 4 in the double steady states can save power consumption of the speaker box 100, and have a stable performance. The negative stiffness diaphragm 42 is a macromolecular film. Electric magnetization and macromolecular film are applied to the speaker box 100 to achieve a moving structure, in this way, reliability can be improved. Moreover, during the control of partially open state or partially closed state of the leakage holes 2010 by the magnetic circuit coupling valve 4, accurate control can be achieved by continuously inputting a small input control signal of an external linear voltage for a short time. The signal is determined by a stiffness coefficient of the negative stiffness diaphragm 42 and a driving force of the coil 41. Depending on the value of the external linear voltage, an opening degree of the leakage holes 2010 can be controlled with a high accuracy, and a smart control of rear cavity of speaker can be achieved, thereby providing more sound modes and a better bass effect. In this way, the speaker box 100 can accurately control a state of communication of the rear cavity 202 with outside air, and the speaker box 100 can have good acoustic performance.

Figure 6:
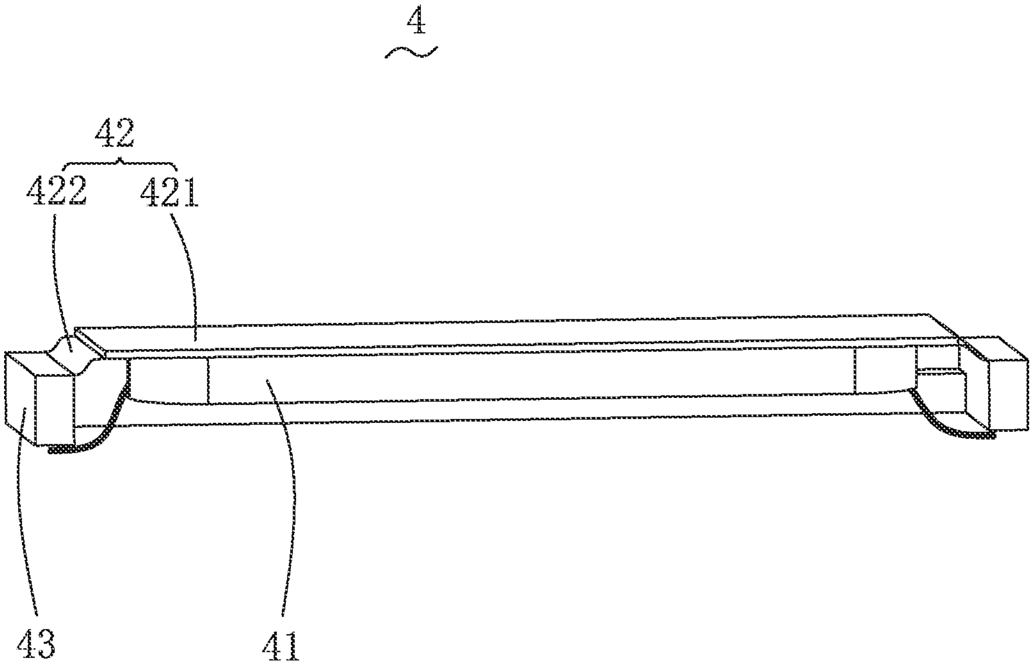
FIG. 6 shows a perspective schematic view of the structure of a magnetic circuit coupling valve in the speaker box in the present invention.
Figure 7:
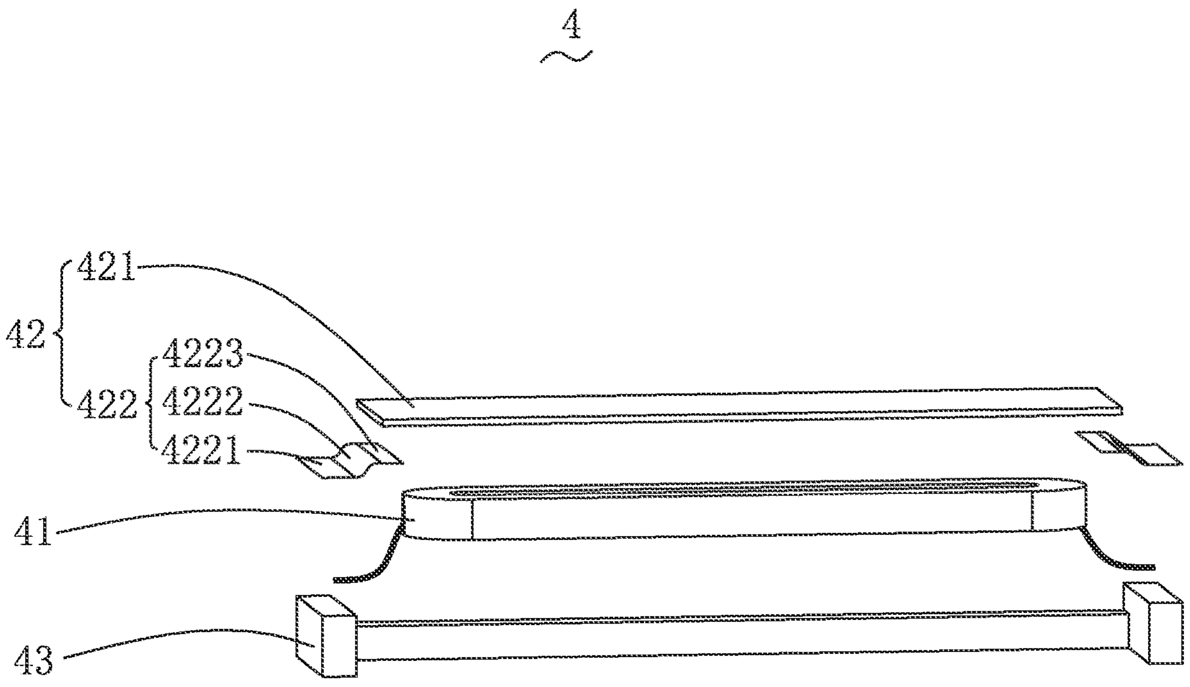
FIG. 7 shows a schematic exploded view of partial structure as shown in FIG. 6.

With reference to FIGS. 6-7, the negative stiffness diaphragm 42 includes an elastic film 422 and a seal 421 for sealing the leakage holes 2010.

The seal 421 is arranged to face to the leakage holes 2010. A pre-pressure design of the seal 421 ensures that the closed state of the rear cavity 202 of the speaker box 100 would not change under an air pressure over 5000 Pa.

The elastic film 422 includes a first fixing portion 1223, an elastic bending portion formed by bending and extending a periphery of the first fixing portion 4223 and a second fixing portion 4221 extending away from a side of the first fixing portion 4223 from the elastic bending portion, the second fixing portion is fixed to a side of the support 43 away from the secondary magnets 33. The coil 41 is fixed to a side of the first fixing portion 4223 close to the secondary magnets 33. The seal 421 is fixed to a side of the first fixing portion 4223 away from the secondary magnets 33.

The first fixing portion 4223 is fixed to a side of the support 43 away from the secondary magnets 33, the elastic bending portion 4222 extends, in a bending way, from the first fixing portion 4223, and the second fixing portion 4221 extends from the elastic bending portion 4222 and is fixed to the seal 421. The rear cavity 202 is in communication with the outside through the leakage holes 2010.

Figure 8:
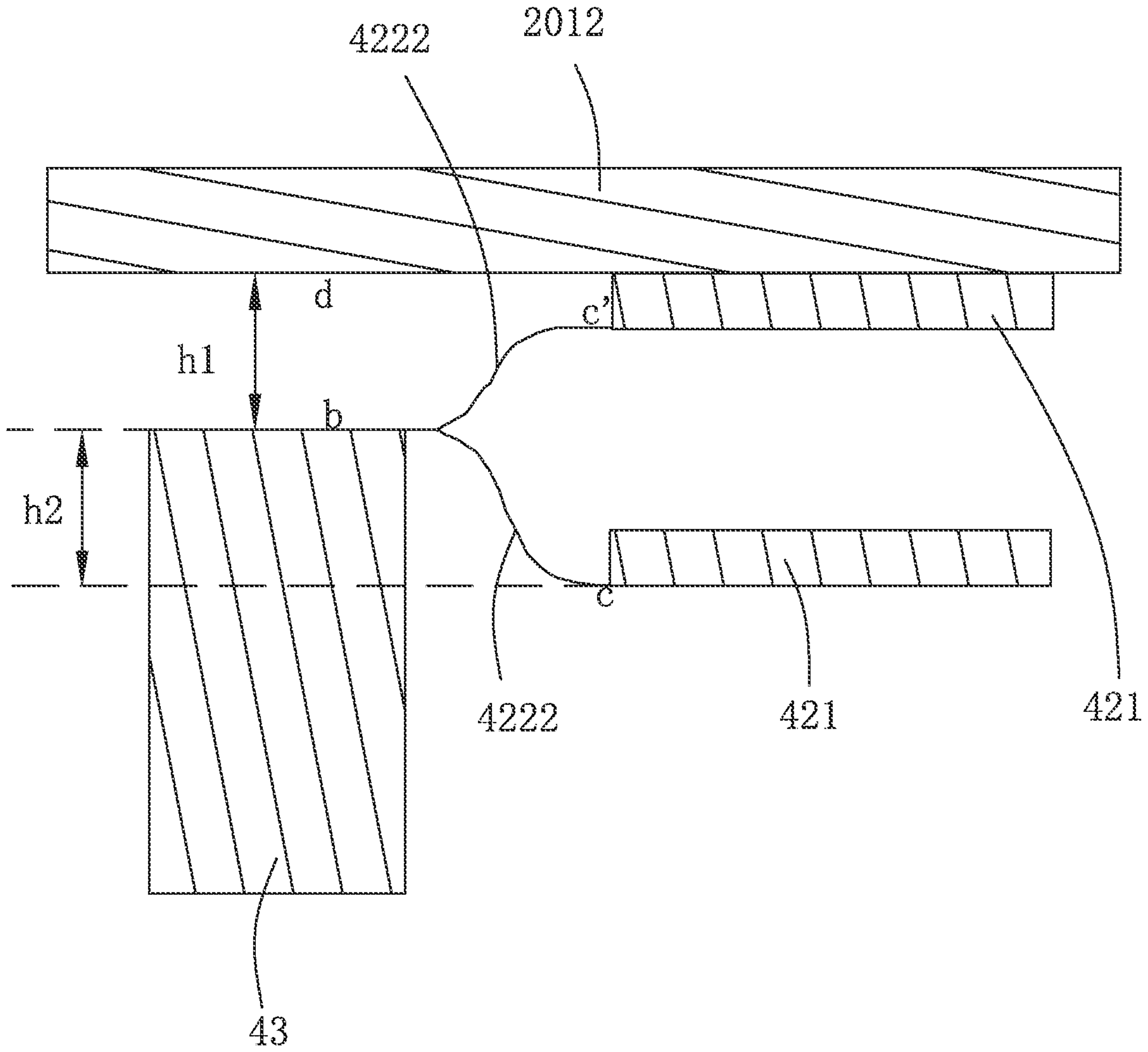
FIG. 8 shows a structural diagram of working principle of the magnetic circuit coupling valve in the speaker box in the present invention.
Figure 9:
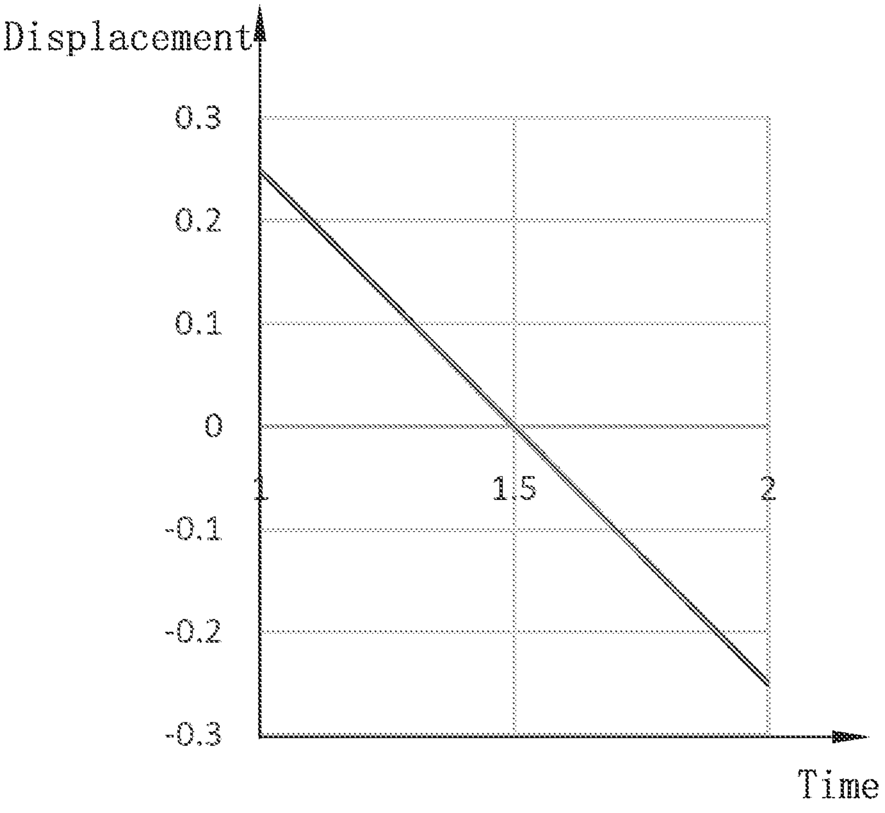
FIG. 9 shows a diagram of a relationship between the displacement and time of a negative stiffness diaphragm in FIG. 8.
Figure 10:
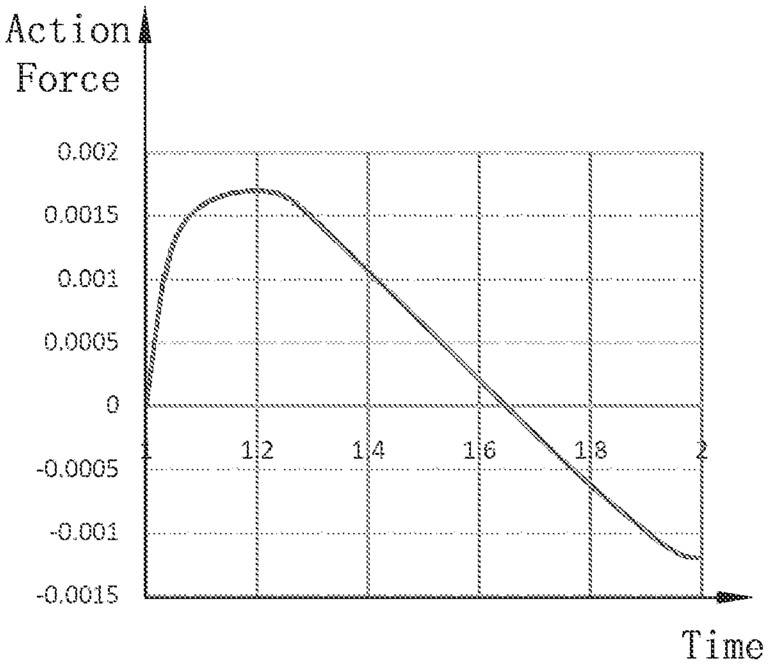
FIG. 10 shows a diagram of a relationship between the action force and time of the negative stiffness diaphragm in FIG. 8.

In response to there being no current in the coil 41, a distance between the second fixing portion 4221 and the seal 421 in a moving direction of the coil 41 is greater than a distance between the second fixing portion 4221 and the bottom cover side wall 2012 on which the leakage holes 2010 are formed in the moving direction of the coil 41. With reference to FIG. 8, the seal 421 of the negative stiffness diaphragm 42 is supported by the elastic film 422, and is pressed to the bottom cover side wall 2012. A distance between a position b of the second fixing portion 4221 and a position c (the position c is a position where the negative stiffness diaphragm 42 is not in a sealing state) of the first fixing portion 4223 is greater than a distance between the position b of the second fixing portion 4221 and a position c' (the position c' is a position where the negative stiffness diaphragm 42 is not in a sealing state) of the first fixing portion 4223. With this arrangement, the negative stiffness diaphragm 42 can generate a negative stiffness, so as to achieve sealing on the bottom cover side wall 2012 by the seal 421. FIGS. 9-10 are diagrams of a displacement of the first fixing portion 4223 from the position c to the position c' and an elastic reaction force of the bottom cover side wall 2012. According to FIGS. 9-10, intervals in which both the stiffness and the displacement are negative after 1.6 seconds are referred to as negative stiffness intervals.

In some embodiments, the negative stiffness diaphragm 42 is implemented by pre-elongating a film. The pre-elongation of the film includes: on the basis of a distance h1 between the position b and the position d of the bottom cover side wall 2012, an elastic amplitude corresponding to a certain pre-pressure is added, thereby obtaining a distance h2 between the position b and the position c. Then lengths of films on either sides are obtained through curvature integration.

Figure 11:
FIG. 11 shows a structural diagram of implementation of bending inwards a film of the negative stiffness diaphragm in FIG. 8.

The negative stiffness diaphragm 42 also can be implemented by bending inwards a film. With reference to FIG. 11, bending inwards a film includes: a pre-stress is generated by performing extrusion on two ends of the elastic film 422 that is u-shaped towards the middle, thereby obtaining a negative stiffness. A flat member is obtained by blanking. Upon assembly, a pre-stress is achieved by limiting position i, position j and position k of the elastic film 422.

In some embodiments, the negative stiffness diaphragm 42 is a symmetrical structure or an asymmetrical structure. When the negative stiffness diaphragm is a symmetrical structure, the negative stiffness diaphragm 42 is in a form of a bilaterally symmetrical or quadrilaterally symmetrical rectangle. When the negative stiffness diaphragm is an asymmetrical structure, the negative stiffness diaphragm 42 is in a form of a rectangle with four asymmetrical corners, or a side of the negative stiffness diaphragm may be fixed by a hinge and an opposite side of the negative stiffness diaphragm is in a negative stiffness bending form. Alternatively, the seal 421 is in a form of a triangle. When the seal is in a form of a triangle, a negative stiffness diaphragm provided with a hinge structure is formed on each side of the seal 421. A bottom side of the triangle functions as a pre-pressure film, and a vertex of the triangle functions as a hinge film.

In some embodiments, the elastic support component 23 is provided with four pads 230 each arranged at a respective corner of the elastic support component 23. The pads 230 are provided on the elastic member 231 electrically connected with the sound coil 22 and the coil 41, respectively. The sound coil 22 has two wires each welded to a respective pad 230 of two of the four pads. The coil 41 has two wires each welded to a respective pad of the other two of the four pads 230, or one of the two wires of the coil 41 is welded to one of the two pads 230 to which the two wires of the sound coil are welded, so as to share with the sound coil 22 one pad 230 that functions as a negative electrode. This structure may enable the wires of the coil 41 to individually use two unused pads 230 of the elastic support component 23, or to share one pad 230 functioning as a negative electrode. In this way, a circuit connection structure of the speaker box 100 can be simple and be easy for connection.

In some embodiments, in order to improve sealing performance of the negative stiffness diaphragm 42 better, the speaker box 100 further includes a gasket 5 accommodated in the rear cavity 202. The gasket 5 improves air impermeability between the negative stiffness diaphragm 42 and the bottom cover side wall 2012. The gasket 5 is fixed to an inner side of the bottom cover side wall 2012 on which the leakage holes 2010 are formed. In order to improve the sealing performance of the negative stiffness diaphragm 42 better, a shape of the gasket 5 is matched with the bottom cover side wall 2012. The gasket 5 may be any one of a rubber sheet, flexible foam, macromolecular gel or high-viscosity grease.

Compared with a related technology, in the speaker box according to the present invention, the magnetic circuit coupling valve is arranged in the rear cavity. The magnetic circuit coupling valve includes the support, the coil and the negative stiffness diaphragm. A plurality of leakage holes are formed in the bottom cover of the housing. The support is fixed to the bracket or the yoke. The negative stiffness diaphragm is fixed to the support. The coil is fixed on a side of the negative stiffness diaphragm close to the secondary magnet and is separated from the secondary magnet. The negative stiffness diaphragm faces to and is separated from the leakage holes. With the structure as described above, when the negative stiffness diaphragm is in operation, the coil receives an external control signal and generates an electromagnetic field with the secondary magnet to drive the negative stiffness diaphragm to abut on and seal the leakage holes to a closed state, or drive the negative stiffness diaphragm to separate from the leakage holes to make the leakage holes open, or drive the negative stiffness diaphragm to partially abut on the leakage holes to make the leakage holes partially open or closed. In other words, the negative stiffness diaphragm can seal the leakage holes. Use of the negative stiffness diaphragm can optimize sound leakage control and enhance acoustic isolation. In this way, the acoustic performance of the speaker box can be improved. In addition, the structure as described above can achieve communication of the rear cavity with the outside by accurately controlling the leakage holes through the magnetic circuit coupling valve. Double steady states, i.e. a steady open state or a steady closed state of the magnetic circuit coupling valve can be achieved by merely inputting an input control signal of an external linear voltage once for a short time, to control the magnetic circuit coupling valve to open or close. During the control of partially open state or partially closed state of the leakage holes by the magnetic circuit coupling valve, accurate control can be achieved by continuously inputting a small input control signal of an external linear voltage for a short time. The signal is determined by a stiffness coefficient of the negative stiffness diaphragm and a driving force of the coil. In this way, the speaker box can accurately control a state of communication of the rear cavity with outside air, and the speaker box can have good acoustic performance.

The above-described are only embodiments of the present invention. It should be noted that skilled persons in the art may make improvements without departing from the concept of the present invention. All these improvements fall into the scope of protection of the present invention.

What is claimed is:

1. A speaker box, comprising a housing and a sound unit fixedly accommodated in the housing, wherein the sound unit comprises a bracket, a vibration system and a magnetic circuit system having a magnetic gap, the vibration system and the magnetic circuit system are fixed to the bracket, the magnetic circuit system comprises a yoke, a primary magnet fixed to the yoke and a secondary magnet spaced from the primary magnet to form the magnetic gap, wherein the housing comprises a bottom cover fixed to the bracket, the bottom cover, the bracket and the magnetic circuit system form a rear cavity, the bottom cover comprises one or more leakage holes provided through the bottom cover, and the rear cavity is in communication with outside through the one or more leakage holes; and the speaker box further comprises a magnetic circuit coupling valve accommodated in the rear cavity, the magnetic circuit coupling valve comprises a support fixed to the bracket or the yoke, a negative stiffness diaphragm fixed to the support and a coil fixed on a side of the negative stiffness diaphragm close to the secondary magnet and separated from the secondary magnet, the negative stiffness diaphragm faces to and is separated from the one or more leakage holes, and the coil receives an external control signal and generates an electromagnetic field with the secondary magnet to drive the negative stiffness diaphragm to abut on and seal the one or more leakage holes to a closed state, or drive the negative stiffness diaphragm to separate from the one or more leakage holes to make the one or more leakage holes open, or drive the negative stiffness diaphragm to partially abut on the one or more leakage holes to make the one or more leakage holes partially open or closed.

2. The speaker box according to claim 1, wherein there are two secondary magnets arranged on either sides of the primary magnet, the bottom cover comprises a bottom cover plate arranged to face to and separate from the yoke and a bottom cover side wall that bends at a periphery of the bottom cover plate and extends from the periphery along an outer surface of the sound unit, the bottom cover side wall is fixedly connected to the bracket, the one or more leakage holes are formed on the bottom cover side wall, and the magnetic circuit coupling valve is arranged on a side of one of the two secondary magnets away from the primary magnet.

3. The speaker box according to claim 2, wherein the negative stiffness diaphragm comprises an elastic film and a seal for sealing the one or more leakage holes, the seal is arranged to face to the one or more leakage holes, the elastic film comprises a first fixing portion, an elastic bending portion formed by bending and extending a periphery of the first fixing portion and a second fixing portion extending away from a side of the first fixing portion from the elastic bending portion, the second fixing portion is fixed to a side of the support away from the secondary magnets, the coil is fixed to a side of the first fixing portion close to the secondary magnets, the seal is fixed to a side of the first fixing portion away from the secondary magnets, and in response to there being no current in the coil, a distance between the second fixing portion and the seal in a moving direction of the coil is greater than a distance between the second fixing portion and the bottom cover side wall on which the one or more leakage holes are formed in the moving direction of the coil.

4. The speaker box according to claim 3, wherein the negative stiffness diaphragm is a symmetrical structure or an asymmetrical structure.

5. The speaker box according to claim 4, wherein the negative stiffness diaphragm is in a form of a bilaterally symmetrical or quadrilaterally symmetrical rectangle, or of a rectangle with four asymmetrical corners, or a side of the negative stiffness diaphragm is fixed by a hinge and an opposite side of the negative stiffness diaphragm is in a negative stiffness bending form.

6. The speaker box according to claim 2, wherein the magnetic circuit system further comprises a secondary magnetic conductive plate fixed to a side of the secondary magnets away from the yoke, the coil is shaped as a runway structure, and the secondary magnetic conductive plate at least partially extends into the coil.

7. The speaker box according to claim 2, wherein the speaker box further comprises a gasket accommodated in the rear cavity, the gasket is fixed to an inner side of the bottom cover side wall on which the one or more leakage holes are formed.

8. The speaker box according to claim 7, wherein the gasket is a rubber sheet, flexible foam, macromolecular gel or high-viscosity grease.

9. The speaker box according to claim 1, wherein the vibration system comprises a diaphragm fixed to the bracket and a sound coil fixed to the diaphragm and inserted into the magnetic gap, the sound coil is configured to drive the diaphragm to vibrate and sound, and the sound unit further comprises an top cover pressed to the diaphragm and forming a front cavity with the diaphragm, sound holes are defined in the top cover, and the front cavity is in communication with the outside through the sound holes.

10. The speaker box according to claim 9, wherein the vibration system further comprises an elastic support component fixed to the bracket and connected to an end of the sound coil away from the diaphragm, the elastic support component is provided with four pads each arranged at a respective corner of the elastic support component, the sound coil has two wires each welded to a respective pad of two of the four pads, and the coil has two wires each welded to a respective pad of the other two of the four pads, or one of the two wires of the coil is welded to one of the two pads to which the two wires of the sound coil are welded, so as to share with the sound coil one pad that functions as a negative electrode.

* * * * *